July 5, 1960 C. BOSCH 2,944,154
PHOTOELECTRIC SPEEDOMETER, ALTIMETER AND COURSE INDICATOR
Filed July 14, 1959 7 Sheets-Sheet 4

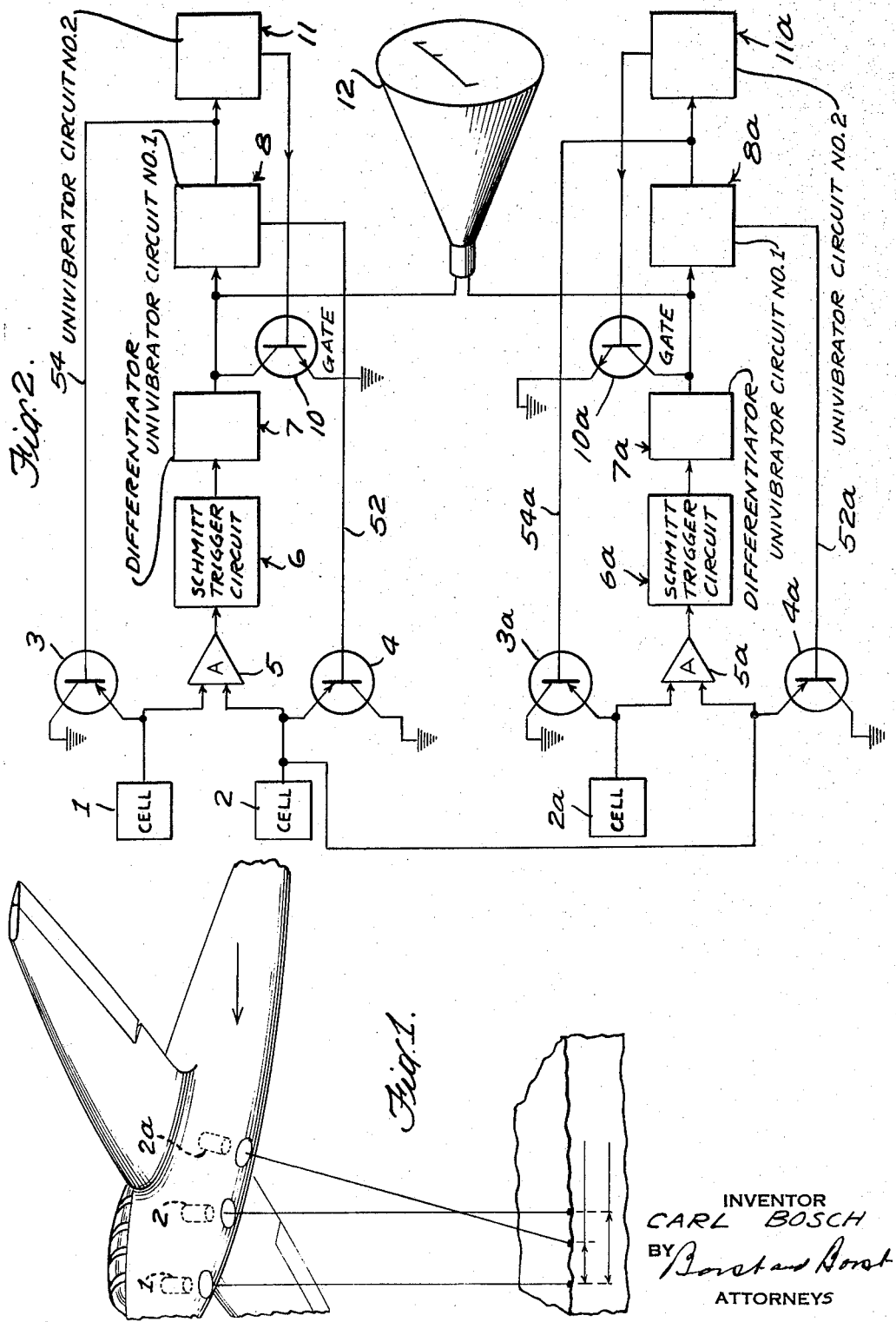

Fig. 4A.

INVENTOR
CARL BOSCH
BY
ATTORNEYS

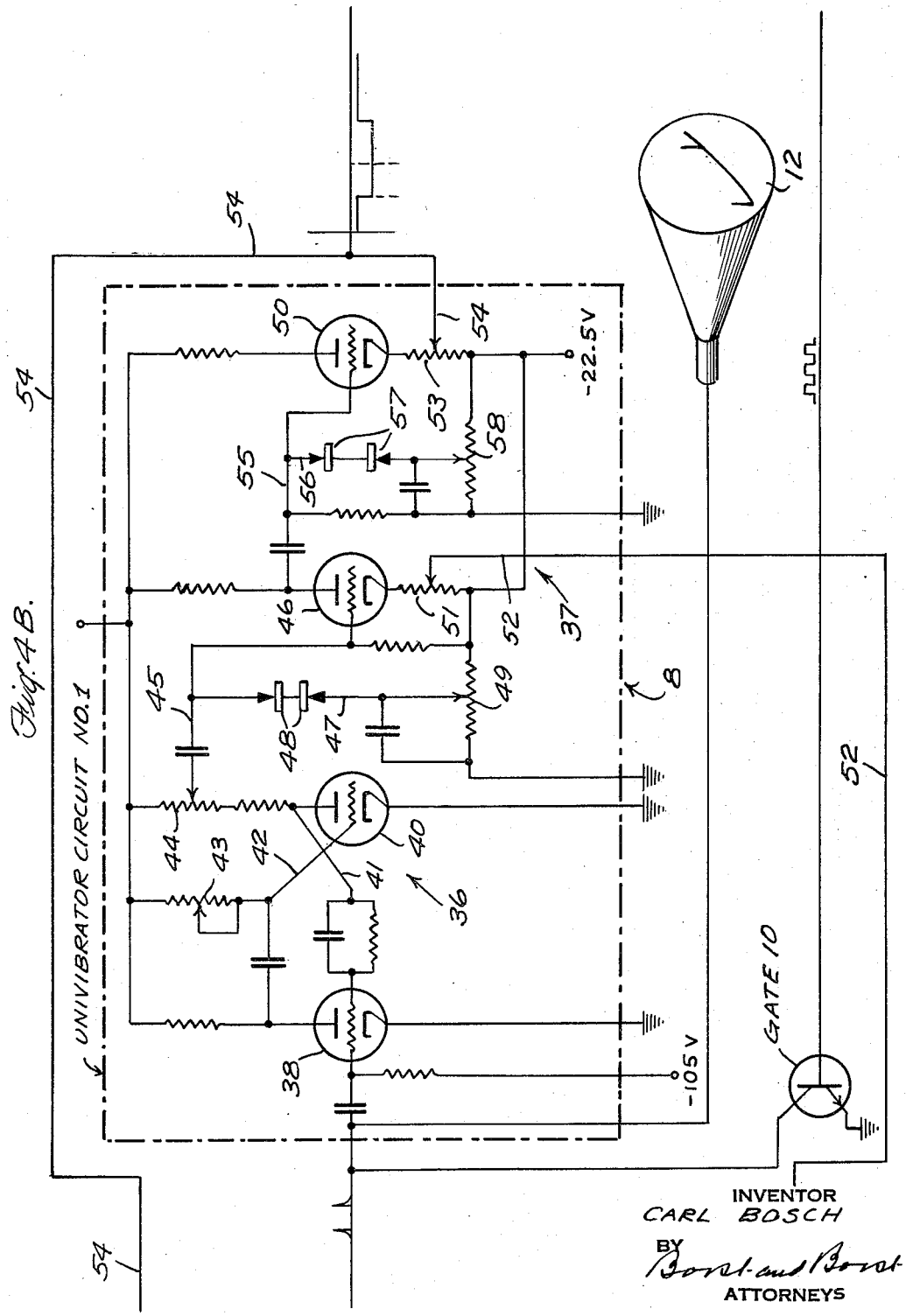

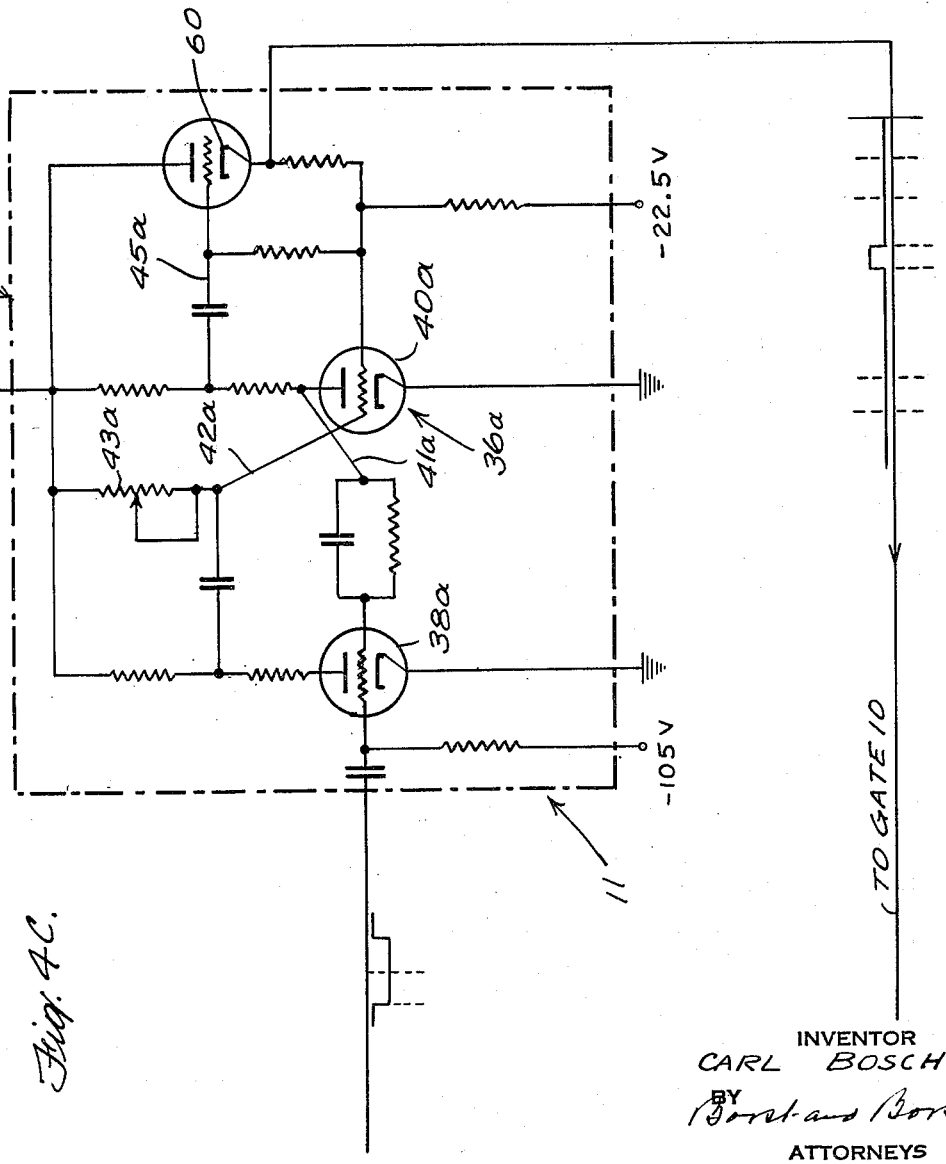

2,944,154
Patented July 5, 1960

2,944,154

PHOTOELECTRIC SPEEDOMETER, ALTIMETER AND COURSE INDICATOR

Carl Bosch, New York, N.Y., assignor to Sperry Rand Corporation, Ford Instrument Company Division, Wilmington, Del., a corporation of Delaware Filed July 14, 1959, Ser. No. 827,052

6 Claims. (Cl. 250—209)

This invention relates to navigation indicating systems and particularly to an electronic system which is adapted to be employed in aircraft and like vehicles for indicating altitude, true ground speed and true course.

The navigation system which is arranged in accordance with this invention can be associated with simple mechanical or electrical computers so as to enable the pilot of a low flying aircraft, for example, to make aeronautical calculations without the use of radar, radio or other type of active transmission. Instead it employs the natural radiation of light as the source of information. This passive manner of operation allows the pilot to maintain complete radio silence, thereby precluding jamming or detection as a consequence of its operation.

In general, the indicating system comprises a pair of photocells which are vertically mounted one behind the other in the bottom of an aircraft either on a stable or rotatable platform and a third photocell in line with the first two photocells at an angle with the vertical. The electronic circuitry employs transistor switches which are controlled by a timer to connect normally two of the three cells into the system and to cause, for a given time duration, the other cell to be connected when the signal output of the first or second cell reaches a preselected level. A pulse generator in the output is adapted to respond to either cell at this level. If it is assumed that the radiation from the same object on the ground causes the system to generate three consecutive pulses initiated by the respective cells, an indicator such as a cathode ray tube having an appropriately calibrated face can be arranged to display the pulses as pips and values of ground speed and altitude, for example, may be mentally derived therefrom. Also computers may be employed to give the desired values directly.

There follows a more detailed description of a circuit arranged in accordance with the inventive concept and illustrated in the accompanying drawings, in which Fig. 1 is an illustration of the system in an aircraft;

Fig. 2 is a block diagram illustrating a preferred circuit arrangement;

Figs. 4, 4A, 4B and 4C are continuous schematic diagrams of the system;

Figure 3:
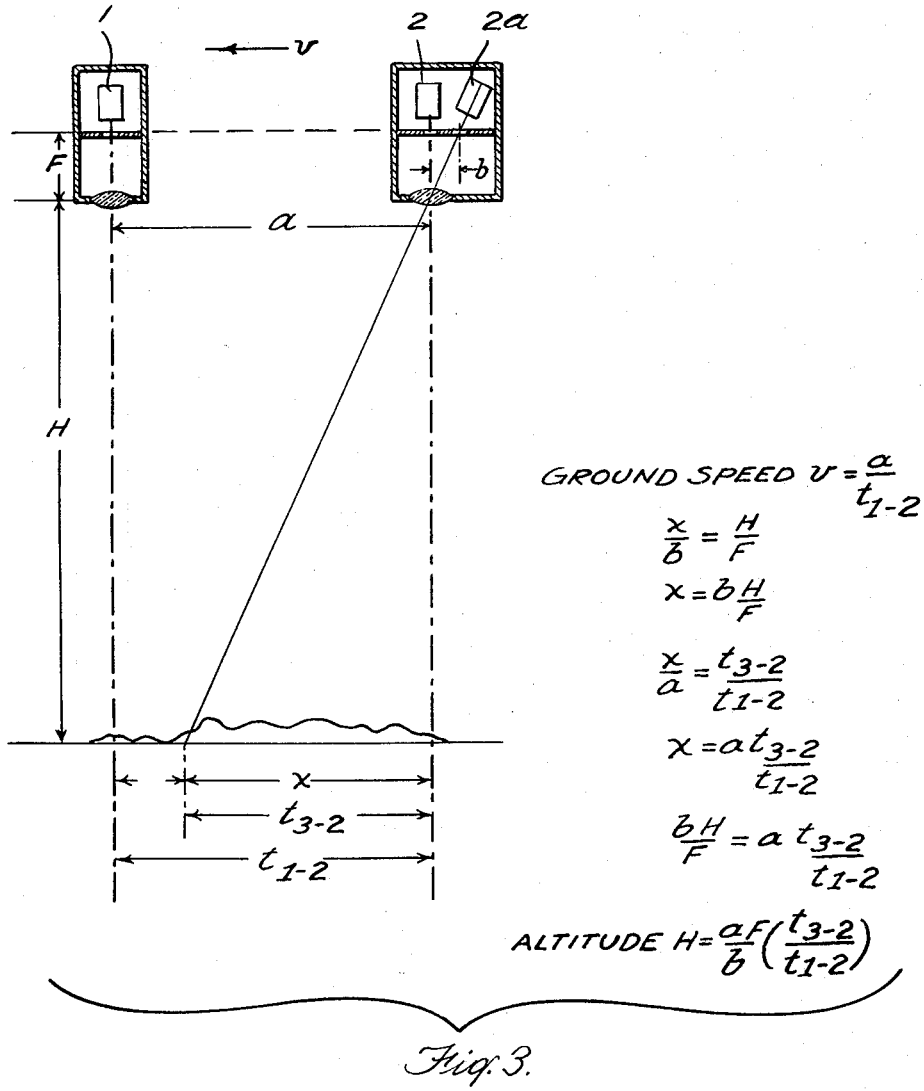
Fig. 3 illustrates the geometric configuration of the aeronautical problem solved by the system.

Referring to the illustration of Fig. 1, lead photocell 1 and trailing photocells 2 and 2a are the radiation sensitive components which are spaced at a given distance apart from each other along the axis of the airborne vehicle being disposed toward the ground. As shown in the black diagram of Fig. 2, the cells 1 and 2 are connectable through transistor switches 3 and 4, respectively, to amplifier 5 which applies one of the amplified signals from the photocells to a Schmitt trigger circuit 6. Also in the altitude section of the computer, which is arranged identically to the ground speed section, the cell 2 and the cell 2a are connectable to the amplifier 5a through transistor switches 4a and 3a, respectively. The two sections being identical the ground speed section only will be specifically described. The trigger circuit 6 is adapted to deliver a positive square wave each time its input voltage exceeds a certain critical value and maintain this square wave output as long as the input voltage remains above this critical value. Differentiator 7 is employed to differentiate the leading edge of the Schmitt trigger circuit output pulse and apply this sharply rising and narrow pulse to univibrator 8 through transistor gate 10. The univibrator is essentially a timer in control of the switches being triggered by the differentiated pulse. The gate 10 holds the univibrator 8 inoperative while it is recovering. An output lead for each state of the univibrator is in control of the switches 3 and 4 the state of which determine which photocell output is to be applied to the amplifier 5. The transistorized gate 10 is controlled by the square wave output of univibrator 11 which is in turn triggered by one of the state output pulses of the univibrator 8. An oscilloscope 12 receives the output of the differentiator 7 each time the Schmitt trigger circuit 6 is fired. The Schmitt trigger circuit 6 is fired by the signals generated whenever the lead cell and then the trailing cell which are gated in succession onto the amplifier 5 reach a preselected level. This is because the successive gating of the cells onto the amplifier determines the time interval between observations and it is the time interval between observations of a ground object which causes the cells to exceed a particular level and which is used to calculate velocity and altitude either by mental operation or by means of a simple computer. Formulas for deriving velocity, V, and altitude, H, are set forth as follows:

$$(1) \qquad v = \frac{a}{t_{1-2}}$$

$$(2) \qquad H = \frac{aF}{b} \frac{t_{3-2}}{t_{1-2}}$$

Obviously if velocity is desired the cells 1 and 2 in Fig. 1 would be cells 1 and 2 in Fig. 3 so that $t_{1-2}$ can be determined as required in the relation for velocity, V, whereas, if altitude is desired, cells 2 and 2a in Fig. 1 would be cells 2 and 2a in Fig. 3 so that time interval $t_{3-2}$ may be determined as required in the relation for altitude, H. Fig. 3 illustrates the geometrical configuration of the system in an aircraft. Photocells 1 and 2 are mounted vertically at a distance "a" apart behind lenses of focal length "F." Photocell 2a is tilted at an angle to the vertical and is placed so that its aperture is at a distance "b" from the aperture of cell 2. As the landscape passes beneath the plane a particular signal appears at the photocells in a time sequence such as to appear first at cell 1, then at cell 2a, and finally at cell 2. Measurements made of these time intervals are then utilized in computing ground speed and altitude as indicated in Equations (1) and (2), respectively. The derivation of Equation 2 is indicated in Fig. 3. The face of the oscilloscope may have a calibrated scale so that the time between pip generations can be directly taken therefrom.

Figure 4:
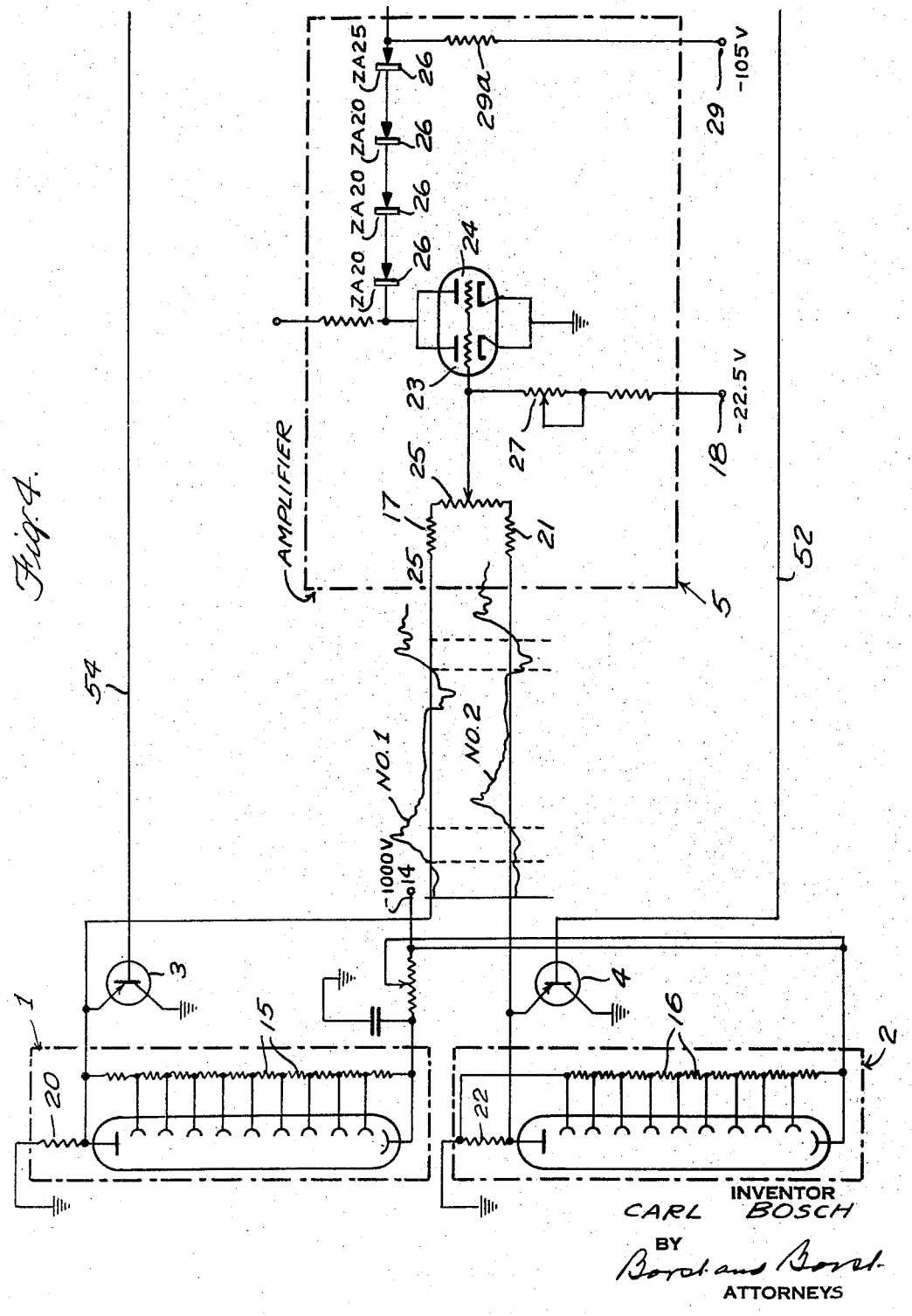

A detailed description of the system follows:

Referring to Fig. 4 it may be seen that the multiplier cells 1 and 2 are connected in the conventional manner to a negative 1000 volt regulated power supply 14. 100 K ohm resistors 15 in the cell 1 and 100 K ohm resistors 16 in the cell 2 are connected between each dynode thereby setting the dynodes at 100 volt intervals and limiting the power supply current to 1.0 milliampere per photocell. The anode of the cell 1 is connected to a 51 K ohm amplifier input resistor 17 which is supplied by the negative source 18 and is also connected to grounded 20 K ohm resistor 20 and the transistor switch 3. The anode of the cell 2 is connected to input resistor 21 supplied by the source 18, a grounded 20 K ohm resistor 22 and the transistor switch 4. The amplifier 5 comprising dual triodes 23 and 24 is grid connected to potentiometer 25 disposed between the resistors 17 and 21 and the source 18 to provide equal summing resistors and a 100 K ohm potentiometer is inserted in the cathode circuit of the cell 2 for introducing equal photocell characteristics into the system. The transistor switches are of the PNP type. They have grounded collectors and are connected in an inverted manner so that their individual impedance is 1 megohm in the open condition and 10 ohms in the saturated condition. The saturated transistor thus effectively short circuits its photocell and allows the signal of the other cell to be applied to the input of the amplifier. Control voltages for opening and saturating the transistor switches are obtained from the univibrator circuit 8.

Zener diodes 26 are used to direct couple the D.C. amplifier 5 to the Schmitt circuit. A negative supply 29 and amplifier bias resistor 29a are connected into the coupling connection for the purpose of setting the bias level of the Schmitt circuit at some point below its control value. The D.C. amplifier 5 is provided with a grid biasing potentiometer 27 supplied by the negative source 18 and grid biases the Schmitt trigger circuit 6 so that it effectively establishes the level of random noise signal which will cause the Schmitt trigger unit to fire.

As shown in Fig. 4A the Schmitt trigger circuit 6 is a conventional cathode coupled binary circuit having a capacitive coupling between the plate of triode 30 and the grid of triode 31. The latter is normally conducting but is adapted to be cut off when an input signal appears on the grid of triode 30 and to yield to the RC differentiator 7 a sharply increased output which should attain the voltage level of the plate supply for the two tubes in the trigger circuit. RC differentiator 7 is connected to receive this positive output pulse of the trigger circuit on conductor 32 in which there is disposed a capacitor 33 and to which there are connected a grounded resistor 34 and a negatively poled diode 35.

The univibrator circuit 8 comprises a monostable multivibrator 36 having a dual cathode follower 37 in its output. See Fig. 4B. The monostable multivibrator 36 includes a pair of plate to grid coupled triodes 38 and 40. Each of the triode coupling connections 41 and 42 are capacitive and the connection 42 controlled by a potentiometer 43 (see Fig. 4B) connecting it to the plate source. A plate resistor 44 of the triode 40 is tapped by grid lead 45 which places the output of the multivibrator on the grid of triode 46 of the dual cathode follower 37. A grounded grid limiting lead 47 having a back to back clipping diode 48 and a level potentiometer 49 is also connected into the grid lead 45. The triode 46 coupled to triode 50 is connected on its cathode output side to amplitude potentiometer 51 and by lead 52 to the base of transistor switch 4 while triode 50 is connected on its cathode output side through amplitude potentiometer 53 and by lead 54 to the base of the transistor switch 3. The plate of the triode 46 is connected by capacitance lead 55 to the grid of the triode 50 so that it is enabled to cut off the tube 50 as it begins to conduct due to the presence of an incoming signal and to allow conduction through the tube 50 when it is in the off state. A grid limiting lead 56 having a back to back diode 57 and a level potentiometer 58 is connected to the coupling grid lead 55.

The output of the univibrator circuit 8 is placed on the grid of the univibrator circuit 11 in Fig. 4C, which, because it is essentially like the univibrator circuit 8, corresponding elements have been given the same reference characters except for the letter a added thereto. Additionally, the coupling capacitor in the lead 42a is considerably smaller than the coupling capacity in the lead 42 in order to reduce its time duration in the unstable state resulting in a considerably smaller pulse width. Cathode follower 60 is conventional in its arrangement and receives the output of the monostable multivibrator 36a on its grid and its output is employed to control the transistor gate 10 in the output of the differentiator 7, this output being introduced to the univibrator circuit 8 and the oscilloscope 12 when the multivibrator 36a is in the stable state and shorted to ground when the multivibrator is in the unstable condition. In operation the transistor 3 is held in the open condition by a positive voltage applied to its base while the switch 4 is held in saturation by a negative voltage applied to its base. This permits the random signal from the cell 1 to be applied to the amplifier while the switch 4 is effectively shorting the signal from the cell 2. When a signal appears of sufficient amplitude to fire the Schmitt circuit, the univibrator 8 is triggered causing a negative voltage to appear at the base of the switch 3 and a positive voltage to appear at the base of the switch 4. This causes the switch 3 to saturate or short and the switch 4 to open thereby shorting the cell 1 and allowing the signal of the cell 2 to be applied to the amplifier until the univibrator circuit 8 relaxes to its normal state as determined by its time constant, at which time the initial conditions prevail once more.

The amplifier 5 is assumed to have a gain of 25. Four diodes 26 are used to direct couple the amplifier output voltage to the Schmitt circuit 6. The potentiometer 27 in the grid circuit is used to adjust the level of random signal which will cross the critical level and thus cause the Schmitt circuit to be triggered. As an example, assume the potentiometer is adjusted for a zero signal condition of 140 volts D.C. at the plates of the amplifier 5. As indicated in Fig. 4 the diodes will cause this voltage to drop 85 volts to 55 volts. 60 volts D.C. is assumed to be the critical level required for triggering the Schmitt circuit and hence a 5 volt signal would be sufficient to cause it to trigger. Since the amplifier has a gain of 25, the required amplifier input voltage would be $5/25=0.2$ volt. Therefore, for this particular potentiometer setting a random signal level of 200 millivolts would cause triggering of the Schmitt circuit. The random signal across the photocell load resistor 20 is negative going and the output voltage across the amplifier load resistor 29a is positive-going as required by the Schmitt circuit. The negative 105 volt D.C. supply 29 is used to set the level of the Schmitt circuit at some point below its critical value.

Figure 5:
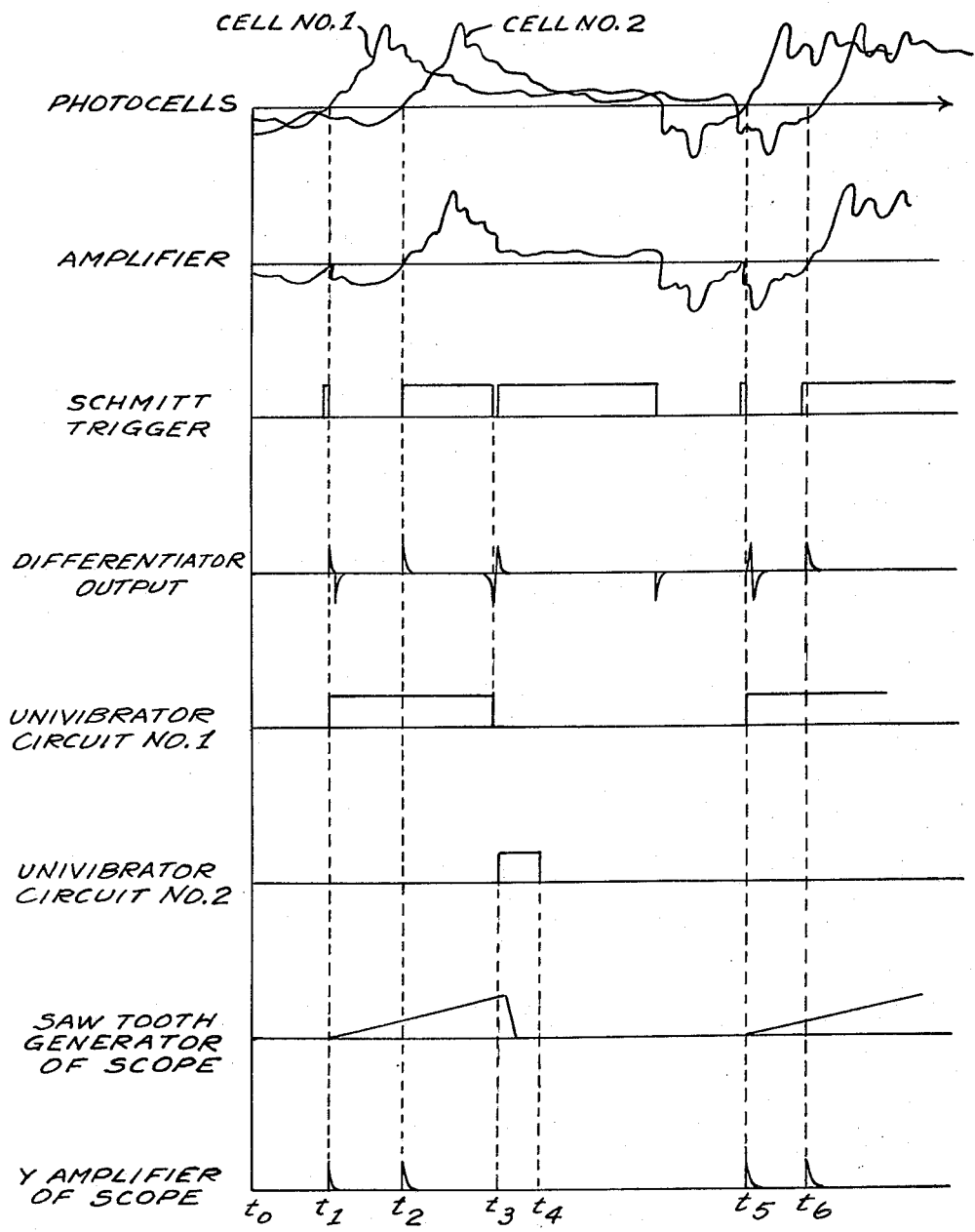
Fig. 5 are time related wave diagrams for the principal components of the system.

Photocell waveform of Fig. 5 illustrates a typical random pattern as observed by the photocells. Since at a time $t_0$, univibrator circuit 8 has not yet been triggered, switch 3 is in an open circuit state while switch 4 is a short circuit. Therefore, the output of cell 1 is applied to the amplifier 5, and the amplifier 5 will reproduce the random pattern of cell 1 up to time $t_1$, as shown by the amplifier waveform. At time $t_1$ the amplifier 5 output voltage crosses the critical level of the Schmitt trigger circuit 6, firing the Schmitt circuit, resulting in a positive output pulse which is fed to the RC differentiator circuit 7 resulting in a sharply rising narrow positive pulse at the start of the square wave output voltage of the Schmitt circuit. The sharp negative pulse of the differentiator is short-circuited by the diode 35, resulting in a sharp positive pulse which triggers univibrator circuit 8 and starts the sweep of the oscilloscope 12. However, at time $t_1$, the triggering of the univibrator circuit 8 causes transistor switch 3 to be in a short circuit state and transistor switch 4 to be in open circuit, thereby abruptly switching the input of the amplifier 5 to cell 2. This switching action is accomplished by means of the positive rectangular output of the univibrator 8 being applied to the dual D.C. cathode follower 37. The back to back diodes 48 in its grid circuits establish the positive and negative extremes of the rectangular pulses appearing at the cathode follower inputs. The purpose of this clipping action is to allow adjustment of the switching pulses so as to prevent any coupling of these switching pulses into the amplifier 5. Positive pulses cause the switches to open while negative pulses cause the switches to saturate. Since the photocell signal is transmitted only during the time when its respective switch is opened, it is necessary for the pulses to be equal in magnitude and thus prevent any switching signal from entering the amplifier 5. If they are not equal, the difference would be amplified by the amplifier 5, causing the photocell signals to be lost in the switching signals. The level potentiometers 49 and 58 adjust the D.C. levels of each cathode follower 46 and 50 so that the proper bias is applied to the base of each transistor switch while the amplitude potentiometers 51 and 53 adjust the positive swings of the switching signals. It is assumed that the level setting of +2.0 volts D.C. applied to the base of the transistor switch 3 causes it to block while applying —5.0 volts D.C. to the base of the transistor switch 4 causes it to saturate. During the time interval of the unstable state of the univibrator 8, the base of transistor switch 3 drops to —4.0 volts D.C. causing it to saturate while that of the transistor switch 4 rises to +2.0 volts D.C. causing it to be in the blocked condition. Since the amplified output of cell 2 is now below the critical level, the Schmitt circuit 6 will immediately return to its normal state. At time $t_2$, the corresponding point on the random signal pattern as now seen by cell 2 crosses the critical level of the Schmitt circuit 6, firing the Schmitt circuit again and causing a pip on the oscilloscope 12 display as illustrated on the oscilloscope waveform of Fig. 5. At time $t_3$, univibrator circuit 8 returns to its normal state as determined by its time constant, switching the system back to cell 1 and triggering the univibrator circuit 11. Univibrator circuit 11 is triggered from the trailing edge of the output pulse of univibrator circuit 8 and delivers a positive rectangular waveform to the conventional D.C. cathode follower 60 which in turn controls the transistor gate 10 causing the gate 10 to be a short circuit for the duration of the univibrator circuit 11 pulse, thereby preventing any signal from reaching univibrator circuit 8 during its recovery time.

The transistor gate 10 utilizes the NPN type being normally held in the blocked condition by a negative D.C. voltage applied to its base by the cathode follower 60. Upon arrival of a positive rectangular voltage from the cathode follower, the transistor switches into the saturated condition for the duration of the pulse. This shorts to ground the differentiator output from the univibrator 8 and the oscilloscope 12 and renders the system inoperative until the univibrator 36a returns to its stable state causing the transistor gate to return to its blocked condition.

Ground speed is obtained by measurement of the time interval between $t_1$ and $t_2$ which may be a calibrated scale on the face of the oscilloscope. Altitude requires an additional time measurement from the cell 2a inclined at some angle to the vertical.

The photocells 1 and 2 may be supported by either a stable or a rotatable platform on the airborne vehicle. The advantage of a rotatable platform is that the system could be used to indicate true course. This is assured when the cells are rotated to a position where they are aligned with the ground track of the vehicle and the signal generated by each cell is the same. The cells may be responsive to infrared radiation instead of visual light as would be required for night time operation.

Various modifications may be made in the indicating system without departing from the scope and principle of invention and defined in the appended claims.

What is claimed is:

1. An aeronautical value indicating circuit comprising a pair of photocells adapted to respond to ground radiation, a pulse generator adapted to generate a pulse when its input signal reaches a given value, pulse responsive means connected to said generator and adapted to yield an indication from which said values may be derived, a switch selectively connecting each of said photocells to said generator and timing means connected to receive the output of said generator for controlling said switches, a gate disposed between said pulse generator and said timing means and a second timing means and in control of said gate, said gate being arranged to isolate the first timing means and said pulse generator for a time duration determined by said second timing means.

2. An aeronautical value indicating circuit comprising a pair of photocells, a shorting-conducting switch connected to each photocell, a pulse generator connected to said switches and adapted to generate a pulse when its input signal reaches a given value, a pulse indicator connected to receive the output of said pulse generator, timing means also connected to receive the output of said pulse generator and in control of each of said switches, a gate disposed between said pulse generator and said timing means and a second timing means connected to receive the output of said first timing means and in control of said gate, said gate being arranged to isolate the first timing means and said pulse generator for a time determined by said second timing means.

3. An aeronautical value indicating circuit comprising a pair of photocells, a shorting-conducting switch connected to each photocell, a pulse generator connected to said switches and adapted to generate a pulse when its input signal reaches a given value, a pulse indicator connected to receive the output of said pulse generator, timing means also connected to receive the output of said pulse generator and in control of each of said switches, a gate disposed between said pulse generator and said timing means and a second timing means connected to receive the output of said first timing means and in control of said gate, said gate being arranged to isolate the first timing means and said pulse generator for a time determined by said second timing means, said switching and first timing means controlling said switches so that one of the switches is normally conducting and the other of said switches is normally shorting the output of their connected photocells and said first timing means is arranged to cause the said one switch to short and the said other switch to conduct the output of their connected photocells for a preselected duration of time.

4. An aeronautical value indicating circuit as claimed in claim 3 wherein said timing means are univibrators and said pulse generator includes an amplifier, a Schmitt trigger circuit and a differentiator.

5. An aeronautical value indicating circuit as defined in claim 4 wherein each of said univibrators includes a monostable multivibrator having a cathode follower in its output.

6. An aeronautical value indicating circuit as defined in claim 5 wherein said gates and said switches include transistors the polarity of whose base electrodes are controlled by the univibrator of said first timing means.

References Cited in the file of this patent

UNITED STATES PATENTS 2,866,373    Doyle et al. _____ Dec. 30, 1958